United States Patent [19]
Grasso

[11] Patent Number: 4,582,025
[45] Date of Patent: Apr. 15, 1986

[54] LIQUID LEVEL DETECTOR

[75] Inventor: Albert P. Grasso, Vernon, Conn.

[73] Assignee: The United States of America as represented by the Department of Energy, Washington, D.C.

[21] Appl. No.: 581,933

[22] Filed: Feb. 21, 1984

[51] Int. Cl.[4] .......................... F22B 1/02; G01F 23/24
[52] U.S. Cl. ...................... 122/32; 122/504; 122/447; 122/451.1; 73/295
[58] Field of Search ............ 122/504, 504.2, 509, 122/437, 447, 449, 451.1; 73/295

[56] References Cited

U.S. PATENT DOCUMENTS

| | | | |
|---|---|---|---|
| 2,252,492 | 8/1941 | Cortese | 122/451.1 |
| 2,543,558 | 2/1951 | Spence | 122/504 |
| 2,619,566 | 11/1952 | Mahoney | 122/504 |
| 2,629,551 | 2/1953 | Audino | 122/451.1 |
| 2,997,989 | 8/1961 | Jones | 122/451.1 |
| 3,512,412 | 5/1970 | Weining | 73/295 |
| 3,712,137 | 1/1973 | Zavod | 73/295 |
| 3,935,738 | 2/1976 | Benham | 73/295 |
| 4,354,094 | 10/1982 | Massey et al. | 122/13 A |
| 4,449,404 | 5/1984 | Bohme et al. | 73/295 |

Primary Examiner—Henry C. Yuen
Attorney, Agent, or Firm—L. E. Carnahan; Roger S. Gaither; Judson R. Hightower

[57] ABSTRACT

A liquid level detector for low pressure boilers. A boiler tank, from which vapor, such as steam, normally exits via a main vent, is provided with a vertical side tube connected to the tank at the desired low liquid level. When the liquid level falls to the level of the side tube vapor escapes therethrough causing heating of a temperature sensitive device located in the side tube, which, for example, may activate a liquid supply means for adding liquid to the boiler tank. High liquid level in the boiler tank blocks entry of vapor into the side tube, allowing the temperature sensitive device to cool, for example, to ambient temperature.

8 Claims, 2 Drawing Figures

LIQUID LEVEL DETECTOR

BACKGROUND OF THE INVENTION

The invention described herein arose in the course of, or under, Contract No. DE-AC03-77ET11302 between the U.S. Department of Energy and United Technologies Corporation.

The invention relates to liquid level indicating devices, particularly to liquid level detectors, and more particularly to a liquid level detector utilizing generated vapaor for activating a temperature responsive device.

Over the years, various types of apparatus have been developed for safety or control applications for steam boilers or the like. Such prior known safety and control approaches are exemplified by U.S. Pat. Nos. 2,543,558 issued Feb. 27, 1951 to P. Spence; and 4,354,094 issued Oct. 12, 1982 to R. D. Massey et al.

In addition to the safety and control apparatus, substantial effort has been directed to a variety of types of liquid level alarm or indicating devices. The simplest of such devices is a transparent liquid column connected in parallel with a boiler tank such that the liquid level in the tank can be observed via the liquid column. However, such device must be physically watched by the using personnel. Another prior type of liquid level indicator utilizes a mechanical float positioned at the liquid-vapor interface in the boiler tank, and generates a signal when the liquid level falls below a set level. Other types of prior level indicator's include the use of electrical probes, X-ray or gamma ray monitoring, thermal expansion devices, pressure responsive devices, etc. Also, the prior known liquid level indicating mechanisms utilize devices responsive to a difference or relative change in the liquid phase and the vapor phase of the liquid in a boiler tank. These latter type mechanisms are exemplified by U.S. Pat. Nos. 3,512,412 issued Oct. 19, 1967 to H. H. Weining; and 3,935,738 issued Feb. 3, 1976 to H. M. Benham.

While the prior known liquid level sensing and indicating devices have been effective they have been relatively complicated and expensive. Thus, a need has existed for a more simple and lower cost method of sensing liquid level in a low pressure boiler.

Therefore, it is an object of this invention to provide a simple and low cost approach for detecting or sensing the liquid level in a boiler.

A further object of the invention is to provide a method and apparatus for indicating low liquid level in a boiler which utilizes vapor generated in the boiler.

Another object of the invention is to provide a low cost method and apparatus of sensing the water level in a low pressure boiler utilizing steam generated in the boiler to activate a temperature responsive device when the water level is low.

Another object of the invention is to provide a level control mechanism which utilizes a sensor tube having a temperature responsive device therein through which steam passes under low liquid level conditions.

Other objects of the invention will become readily apparent to those skilled in the art from the following description and accompanying drawings.

SUMMARY OF THE INVENTION

The objects and advantages of the present invention are carried out by providing a simple low cost approach for detecting liquid level in a boiler. Basically the invention involves the use of steam or other vapor generated in the boiler to activate a temperature sensitive device when the liquid in the boiler reaches a specified level. More particularly, a sensor tube having a temperature responsive device located therein is connected to a boiler at the low liquid level point, and when the liquid level drops to that point steam or other vapor generated in the boiler enters the sensor tube causing heating of the temperature responsive device, which in turn may activate associated mechanism for generating a signal, shutting down the boiler, activating a control means for adding liquid to the boiler, etc. When the liquid level again raises above the low level point, the liquid blocks the steam or vapor from entering the sensor tube, which allows the temperature responsive device to cool and thus deactivate any associated mechanism.

DETAILED DESCRIPTION OF THE INVENTION

The invention is directed to a simple low-cost liquid level detector or sensor, particularly applicable for low pressure boilers, such as a fuel cell water tank deaerator, cooking steam chests, etc. The invention basically involves the use of a small sensor tube located at the low liquid level of a boiler tank, which allows steam or other vapor to vent therethrough under low liquid level conditions, the steam causing heating of a temperature responsive device which may activate an alarm, activate a control, inject additional liquid into the boiler tank, etc. When the liquid level is above the low level point, steam or vapor generated in the boiler is blocked from venting through the sensor tube.

Figure 1:
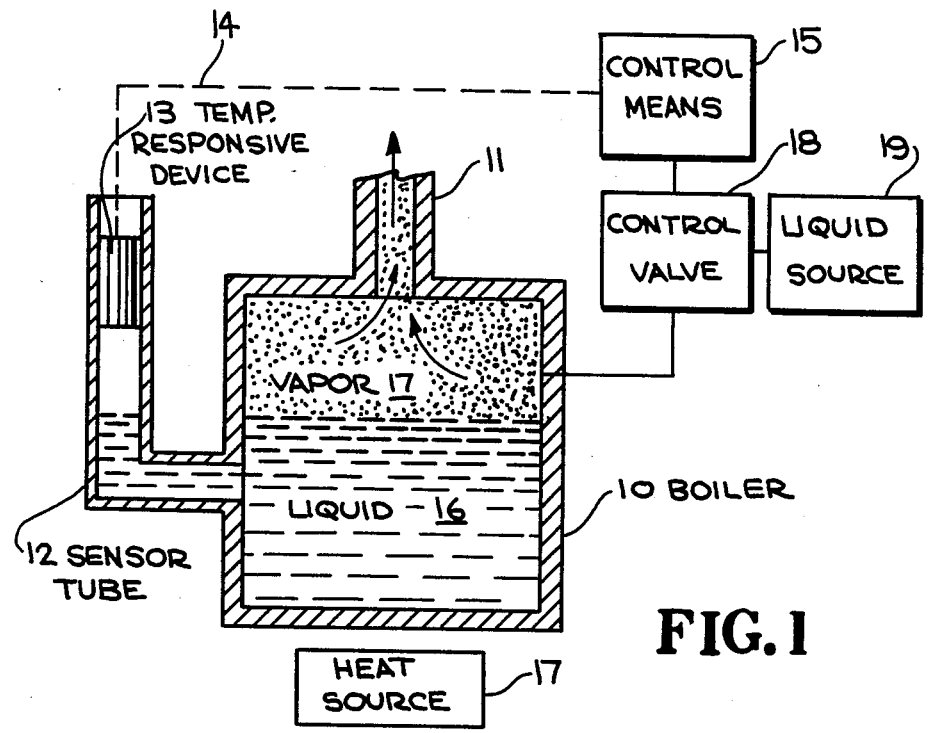
FIG. 1 is an embodiment of the liquid level detecting device of the invention during normal liquid level operation of an associated boiler.

Referring now to FIG. 1, the invention is illustrated by a boiler tank 10 having a main vent 11 in the upper end and provided with an L-shaped sensor tube 12 located at the desired low liquid level point of tank 10. A temperature responsive device or switch 13 is positioned in sensor tube 12 and is operatively connected as indicated at 14 to activate a mechanism or control means, such as a control, alarm, etc., indicated at 15, when a predetermined temperature is reached in sensor tube 12. A liquid 16, such as water, having a level above the sensor tube 12 is heated to boiling by a heat source 17 located beneath tank 10. Steam or other vapor 17 generated in tank 10 is normally vented via main vent 11, as indicated by arrows, and the temperature, $T_s$, in sensor tube 12 is lower than the temperature, $T_t$, in tank 10, ($T_s$ being at room temperature or a temperature between ambient and steam).

Figure 2:
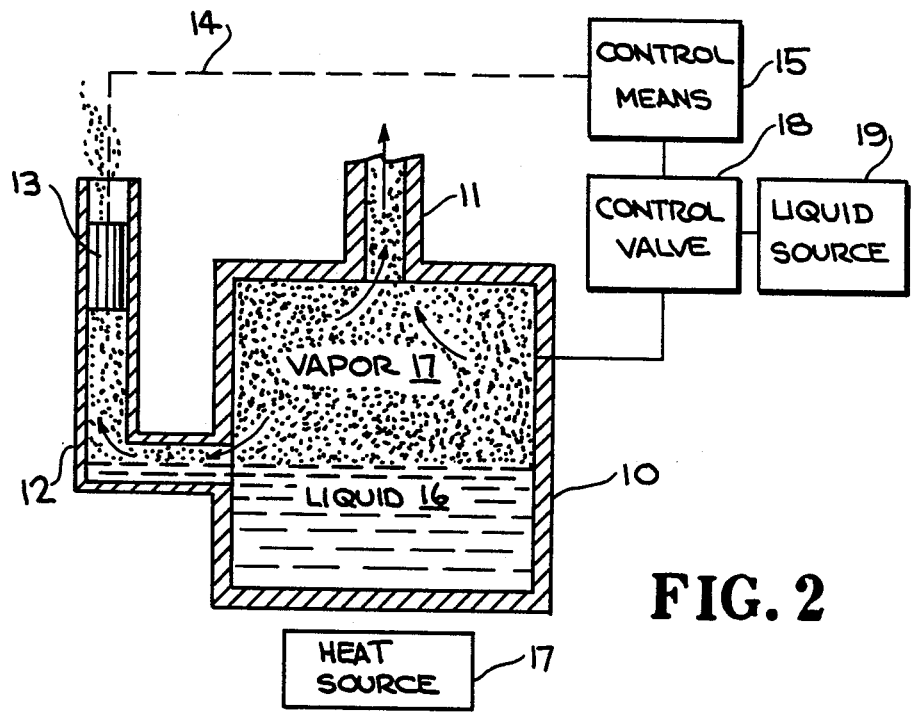
FIG. 2 illustrates the liquid level detecting device of FIG. 1 when the liquid in the boiler drops to a specified low level.

As shown in FIG. 2, when the level of liquid 16 in tank 10 is lowered to the level of the sensor tube 12, steam or other vapor 17, if the liquid is not water, additionally vents through sensor tube 12, as indicated by arrows which raises the temperature, $T_s$, in the sensor tube causing heating of the temperature responsive device or switch 13, which in turn activates the mechanism 15. As pointed out above, mechanism or control means 15 may, for example, activate a control valve 18 which allows liquid to flow from a supply source 19 into tank 10 so as to raise the level of the liquid in the tank to a level above the low level point. Upon raising of the liquid level in tank 10, the liquid again blocks entrance of steam into sensor tube 12, thereby allowing device 13 in tube 12 to cool, thus deactivating mechanism 15 and shutting off the flow of liquid from supply 19 into tank 10.

It is thus seen that a high temperature, $T_s$, in sensor tube 12 equals a low liquid level in tank 10, and a low $T_s$ in sensor tube 12 equals a high liquid level in tank 10. This provides a simple, yet effective and low cost liquid level detector or indicator.

While a particular embodiment of an apparatus for carrying out the invention has been illustrated and described, modifications and changes will become apparent to those skilled in the art, and it is intended to cover in the appended claims all such modifications and changes that come within the scope of this invention.

I claim:

1. In a low pressure boiler for generating a vapor from liquid contained therein, the improvement comprising:
    a low liquid level detector for said boiler which utilizes vapor generated in the boiler, said detector comprising:
    a sensor tube directly connected to the boiler at a low liquid level point on the boiler so that liquid is maintained in at least a portion of the sensor tube under normal operating conditions of the boiler, and
    a temperature responsive means located in said sensor tube and adapted to be activated upon a predetermined increase in temperature in said sensor tube, said temperature responsive means, when activated by increased temperature, is connected to activate a mechanism which controls a liquid control valve operatively connected to the boiler, for allowing liquid to flow into the boiler to raise the level of the liquid therein to a point above said low liquid level point, thereby blocking generated vapor from entering said sensor tube,
    whereby during normal operation of the boiler, liquid level in the boiler is above said low liquid level point, and upon the liquid dropping to said low liquid level point, vapor generated in the boiler is directed through said sensor tube causing an increase in temperature therein and activation of said temperature responsive means.

2. The improvement of claim 1, wherein said sensor tube has an L-shaped configuration.

3. The apparatus of claim 1, wherein said boiler is provided with a main vent in an upper end thereof for normally venting vapor generated therein, and is provided with a heat source for causing liquid in the boiler to produce a vapor by heating of the liquid.

4. The apparatus of claim 1, wherein liquid contained in said boiler is water, and the generated vapor is steam.

5. A liquid level detector which utilizes vapor generated in a boiler for controlling liquid level in a boiler having a heat source for producing a vapor from liquid contained therein, said liquid level detector comprising:
    a sensor tube directly connected to said boiler at a low liquid level point so that under normal operating conditions of said boiler liquid is maintained in at least a portion of said sensor tube,
    a temperature responsive means located in said sensor tube, and
    a liquid control mechanism operatively connected to said temperature responsive means and to said boiler,
    whereby, upon liquid in said boiler reaching said low level point, vapor generated in said boiler passes through said sensor tube causing heating of said temperature responsive means which activates said liquid control mechanism for directing liquid into the boiler such that the liquid is raised above said low level point, thereby blocking passage of vapor through said sensor tube allowing said temperature responsive means to cool thus deactivating said liquid control mechanism.

6. The liquid level detector of claim 5, wherein said sensor tube has an L-shaped configuration.

7. A method using vapor generated in a boiler for detecting and controlling a low liquid level in a boiler comprising the steps of:
    providing the boiler with a sensor tube located at a low liquid level point of the boiler such that under normal operating conditions liquid is maintained in at least a portion of the sensor tube,
    positioning a temperature sensitive means so as to be responsive to the temperature of the sensor tube,
    providing means responsive to the temperature sensitive means for controlling liquid supplied to the boiler,
    causing liquid in the boiler to generate a vapor, such that upon liquid in the boiler reaching the low liquid level point, vapor is directed through the sensor tube cause heating of the temperature sensitive means which activates the means for controlling liquid supplied to the boiler providing a control mechanism operatively connected to the temperature sensitive means, and locating the control mechanism between a liquid supply source and the boiler, such that activation of the temperature sensitive means causes liquid from the supply source to be directed into the boiler.

8. The method of claim 7, additionally including the steps of:
    forming the sensor tube in an L-shaped configuration, and
    positioning the temperature sensitive means in the sensor tube.

* * * * *